United States Patent [19]
MacAlpine

[11] 3,788,671
[45] Jan. 29, 1974

[54] KICK STAND

[76] Inventor: Alexander D. MacAlpine, 50 North Main Street, Natick, Mass. 01760

[22] Filed: Mar. 20, 1972

[21] Appl. No.: 236,421

[52] U.S. Cl. ................................. 280/303, 340/63
[51] Int. Cl. ......................... B62h 1/02, B62h 5/00
[58] Field of Search ... 280/301, 302, 303, 297, 298, 280/293; 340/63

[56] References Cited
UNITED STATES PATENTS

| | | | |
|---|---|---|---|
| 709,588 | 9/1902 | Von Troschke | 280/302 |
| 2,414,903 | 1/1947 | Schultz | 280/301 |
| 643,610 | 2/1900 | Schirra | 280/301 |
| 3,678,455 | 7/1972 | Levey | 340/63 |
| 711,922 | 10/1902 | Corneil | 280/303 |

*Primary Examiner*—Kenneth H. Betts
*Assistant Examiner*—J. D. Rubenstein
*Attorney, Agent, or Firm*—Robert T. Gammons

[57] ABSTRACT

A kick stand provided with a split clamping sleeve by means of which it may be attached to the frame of a bicycle astride the rear wheel fork for pivotal movement from a position in engagement with the ground to support the bicycle in an upright position to a rearwardly disposed position for storage when the bicycle is being ridden and a spring for moving the kick stand to its stored position into engagement with spring clips adapted to hold the kick stand in said stored position.

7 Claims, 5 Drawing Figures

PATENTED JAN 29 1974 3,788,671

KICK STAND

BACKGROUND OF THE INVENTION

The conventional kick stand for supporting bicycles comprises a single leg pivotally mounted to the frame at one side which is movable to an operative position to support the bicycle and in said position supports the bicycle in an inclined position which is more or less unstable. The kick stand forming the subject matter of this invention is designed to afford such stability that it is virtually impossible for the bicycle to tip over and is especially designed for use in conjunction with the tandem trailer disclosed in my pending application which requires that when the bicycle and tandem trailer are unattended that the bicycle be supported in a vertical upright position.

SUMMARY

As herein illustrated the invention comprises the combination with a bicycle frame having an upright rear frame member to which is attached the rear wheel fork, a kick stand comprising spaced legs connected by a bridge piece, said legs being adapted to straddle the upright and the wheel fork, and means pivotally mounting the legs astride the upright with the bridge piece disposed at the front side in a position relative to the pivot such that when engaged with the upright the legs are held engaged with the ground by the weight of the bicycle. Spring means connected to the bridge piece and to the frame forwardly of the upright operates to rotate the legs about their pivot rearwardly to an elevated position above the ground and there is means on the wheel fork cooperable with the distal ends of the legs to hold the latter in said elevated position.

The invention will now be described in greater detail with reference to the accompanying drawings wherein.

Figure 1:
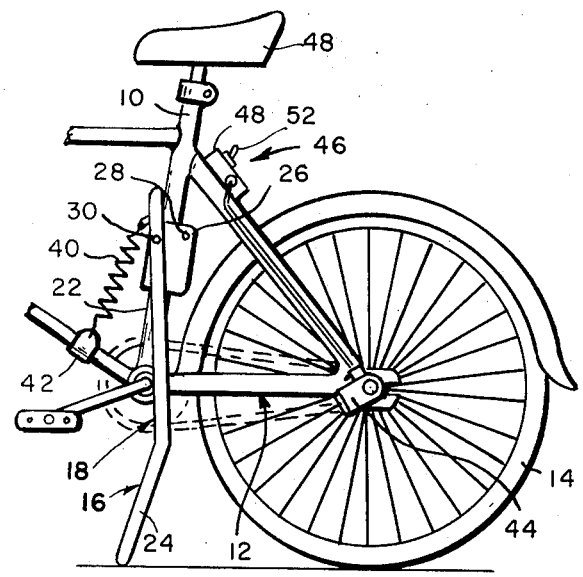
FIG. 1 is an elevation of the rear portion of a bicycle showing the kick stand in its operative position in engagement with the ground so as to support the bicycle in an upright position.

Referring to the drawings (FIGS. 1 and 2), there is shown the rear portion of a bicycle provided with a conventional frame having a rear upright frame member 10 to which is attached the rear wheel fork 12 by means of which the rear wheel 14 is mounted to the frame.

Figure 3:
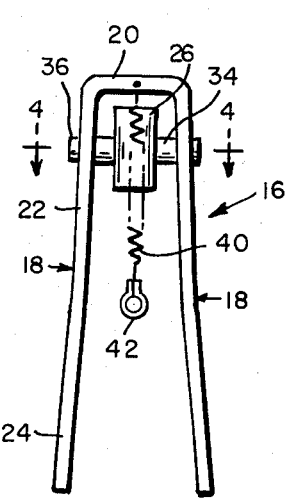
FIG. 3 is an elevation of the kick stand removed from the bicycle frame as seen from the direction of the arrows 3—3 on FIG. 1.
Figure 4:
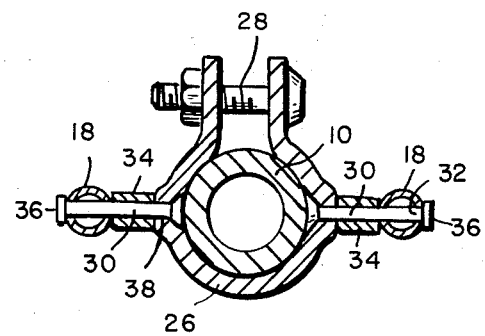
FIG. 4 is a section taken on the line 4—4 of FIG. 1.
Figure 5:
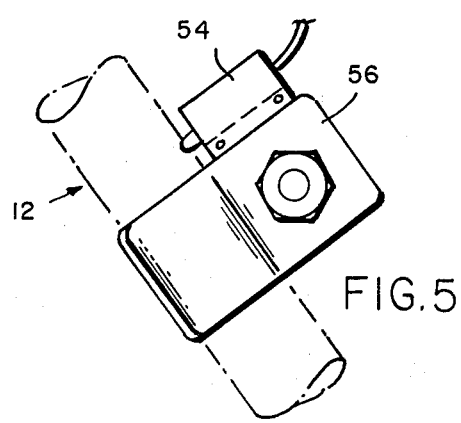
FIG. 5 is a fragmentary view showing a switch attached to the bicycle frame in a position to be operated by the kick stand when the latter is moved to its stored position.

The kick stand 16 of this invention comprises spaced elongate legs 18–18 connected at one end to each other by a bridge piece 20. The legs have straight portions 22–22 and bent portions 24–24, the latter being at the distal ends of the legs and being divergent as illustrated in FIG. 3.

The kick stand is mounted on the upright 10 by means of a split clamp sleeve 26 adapted to fit snugly about the upright which is provided with clamping screws 28 by means of which it may be secured at a predetermined heightwise position on the upright 10. The sleeve has on it diametrically disposed, horizontally extending trunnion pins 30—30 on which the legs 18—18 are adapted to be rotatably mounted and which for this purpose contains holes 32—32 for rotatably receiving the trunnion pins 30—30. Spacing sleeves 34—34 are mounted on the trunnion pins between the sleeves and the legs and the legs are held on the trunnion pins against the sleeve by heads 36—36 which may be formed integral on the ends of the trunnion pins. If thus formed the trunnion pins are inserted through the legs, the sleeves and through holes 38—38 in the clamp sleeve and peened at the inner ends to fix them in place. Optionally, the heads 36—36 may be replaced by nuts threaded onto said ends.

Figure 2:
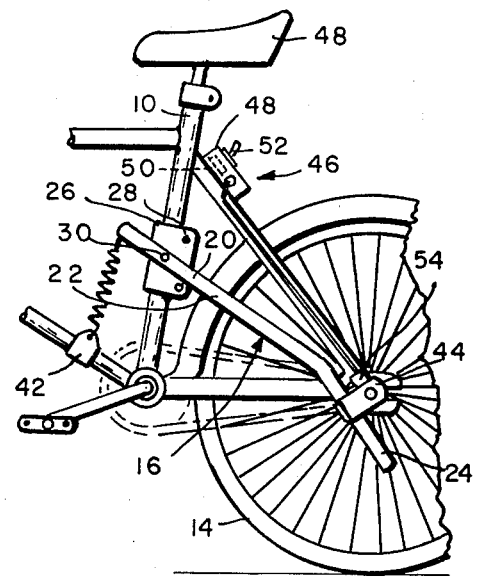
FIG. 2 is a corresponding view showing the kick stand in a stored position such as when the bicycle is being used.

The legs are mounted on the trunnions so that the bridge piece 20 will have engagement with the forward side of the upright 10 when the lower ends of the legs are engaged with the ground and so that the weight of the bicycle will hold the stand in this position. In this position the pivot point, that is, the axis of the trunnions is situated rearwardly of the lower ends of the legs that is the lower ends of the legs are situated forwardly from a perpendicular from the ground to the axis of the trunnion, and so the couple produced about this axis by the weight of the bicycle tends to bias the this axis by the weight of the bicycle tends to bias the stand rearwardly about its axis and thus hold it in operative position. The stand may be moved to its stored position by pushing the bicycle forwardly relative to the lower ends of the legs or by lifting the bicycle and kicking the stand rearwardly. In either case a spring 40, which is connected at one end to the bridge piece 20 and at the other end by means of a clamp 42 to the frame, operates to rotate the stand in a counterclockwise direction as seen in FIGS. 1 and 2, to move the legs rearwardly and upwardly into engagement with spring clips 44 fastened to the wheel fork. The spring clips releasably hold the legs of the kick stand in a stored position when using the bicycle.

In conjunction with the kick stand and operable thereby when the kick stand is moved to its stored position there is provided an alarm 46 which is fastened to the bicycle frame at the rear of the upright 10, for example, on the rear wheel fork just below the saddle 49. The alarm may comprise a buzzer or gong and is contained within a box 48 together with batteries 50 and a toggle switch 52 by means of which it may be turned on or off. A trip switch 54 is mounted by means of a clamp 56 on the wheel fork adjacent the clips 44 so as to be engaged by one of the legs as the latter are moved into their stored position and to be actuated thereby and hence to effect operation of the alarm. Thus by setting the toggle switch 52 to the "on" position when the bicycle is on its stand movement of the bicycle off of its stand by an unauthorized person or accidental upsetting of the bicycle which would result in movement of the stand to its stored position will set off the alarm.

It should be understood that the present disclosure is for the purpose of illustration only and that this invention includes all modifications and equivalents falling within the scope of the invention.

I claim:

1. The combination with a bicycle frame embodying an upright frame member from which extends a substantially horizontal wheel fork comprising spaced parallel fork members at the distal ends of which are wheel supports; a kick stand comprising spaced legs, a bridge piece connecting the legs at one end to each other in spaced relation such that the stand is mountable astride the upright frame member and the fork members, a clamp designed to be removably clamped to the upright frame member, trunnions on the clamp on which the stand is pivotedly mounted astride the forward side of the upright frame member and the legs at the rear side, said kick stand being pivotedly movable about the axis of said trunnions to dispose the bridge piece in engagement with the upright frame member and of such shape that at said position the distal ends of the legs engage the ground forwardly of a perpendicular to the ground through said axis.

2. Apparatus according to claim 1 wherein the clamp comprises a split sleeve adapted to be mounted on the upright of the frame member, and clamping screws for clamping the sleeve to the upright frame member.

3. Apparatus according to claim 1 wherein the legs have straight and bent portions the latter being at the distal ends thereof and the bent ends diverging.

4. Apparatus according to claim 1 wherein a spring is connected at one end to the bridge piece and at its other end to the plane forwardly of the upright frame member such as to rotate the stand in a direction to elevate the legs.

5. Apparatus according to claim 1 wherein there are springed clamps fastened to the fork members for receiving and releasably holding the distal ends of the legs in their elevated positions.

6. Apparatus according to claim 1 wherein there is a switch member mounted on the wheel fork in a position to be actuated by rearward displacement of the legs to an elevated position and wherein an alarm is fastened to the frame which is adapted to be actuated by actuation of a switch.

7. The combination with a bicycle frame embodying an upright frame member from which extends a substantially horizontal wheel fork comprising spaced parallel fork members at the distal ends of which are wheel supports, a kick stand comprising spaced legs, a bridge piece connecting the legs at one end to each other in spaced relation such that the stand is mountable astride the upright frame member and the fork members, a clamp designed to be removably clamped to the upright frame member, trunnions on the clamp on which the stand is pivotedly mounted astride the upright frame member and fork members with a bridge piece at the forward side of the upright member and the legs at the rear side, the legs having straight portions which extend from the bridge piece in a first plane and which diverge in that first plane and bent portions which extend from the straight portions in a second plane making an obtuse angle with the first plane and which diverge in the second plane at a greater angle than in the first plane, such that when the stand is disposed with the straight portions extending rearwardly from the trunnions, the bent ends extend downwardly from the straight portions, the distance between the bridge piece and axis of trunnions being such that when the bridge piece abutts the forward side of the upright frame member the distal ends of the bent portions engage the ground forwardly of a perpendicular from the axis of the trunnions to the ground.

* * * * *